June 24, 1969 J. R. HOLDEN 3,452,339

PROGRESSIVELY SWITCHED MAGNETIC STORAGE DEVICES

Filed Oct. 19, 1965

*INVENTOR.*
JAMES R. HOLDEN

BY C. A. Gulbrandsen

ATTY.

United States Patent Office 3,452,339

Patented June 24, 1969

3,452,339

PROGRESSIVELY SWITCHED MAGNETIC STORAGE DEVICES

James R. Holden, Chicago, Ill., assignor to Automatic Electric Laboratories, Inc., Northlake, Ill., a corporation of Delaware Filed Oct. 19, 1965, Ser. No. 497,877
Int. Cl. G11b *5/00*
U.S. Cl. 340—174 3 Claims

ABSTRACT OF THE DISCLOSURE

A magnetic storage device has a magnetic switching core with a central aperture and a plurality of other apertures positioned at different radial distances from the central aperture. A pulse of current applied to a winding extending through the central aperture reverses the magnetic state of the core progressively outwardly from the central aperture thereby to induce a series of pulses in windings threaded through the other apertures. In order to increase the resolution between pulses generated when the core progressively switches in the area of the outer apertures, a bias winding is threaded through these outer apertures to provide localized magnetic fields.

This invention relates to magnetic storage devices and in particular to circuit arrangements for improving the resolving power of progressively switched magnetic storage devices.

B. E. Briley in his U.S. patent application Magnetic Memory System Employing Multiaperture Devices, Ser. No. 421,749 filed Dec. 21, 1964, and assigned to the same assignee as the present invention, describes a magnetic storage device comprising a bistable magnetic disc having a central aperture and a plurality of other apertures spaced apart on radii of the disc and a plurality of windings threading said apertures to store data in areas between said apertures. A flux wave generated to read the stored data nucleates at the center of the disc and travels outwardly therefrom at a uniform velocity to progressively reverse the magnetic state of the disc and induce output signals in the windings in accordance with the stored data. It has been observed that the resolving power of such a device decreases from the center to the outermost bits as the number of bits is increased and/or as the switching speed is increased so that the output level ratio of "1's" to "0's" becomes smaller. A worst case condition would be an alternating pattern of "1's" and "0's" with the resolving power being measured as the ratio of the last 1 to the last 0.

The object of my invention therefore is to provide multiaperture memory devices which have improved resolving power.

A feature of my invention resides in the use of bias winding means to provide localized magnetic fields at the leading and trailing edges of bit areas to oppose and aid, respectively, the propagating flux wave at said edges. The effect of the opposing magnetic field is to delay switching and reduce the switching time of the leading edge of a bit area. The aiding magnetic field will cause the trailing edge of a bit area to complete switching to its new state sooner. These two effects combine so that the apertures appear farther apart to the propagating flux wave.

Other objects and features of my invention will become apparent and the invention will be best understood from the following description taken in conjunction with the accompanying drawings in which.

Figures 1, 3, 5:
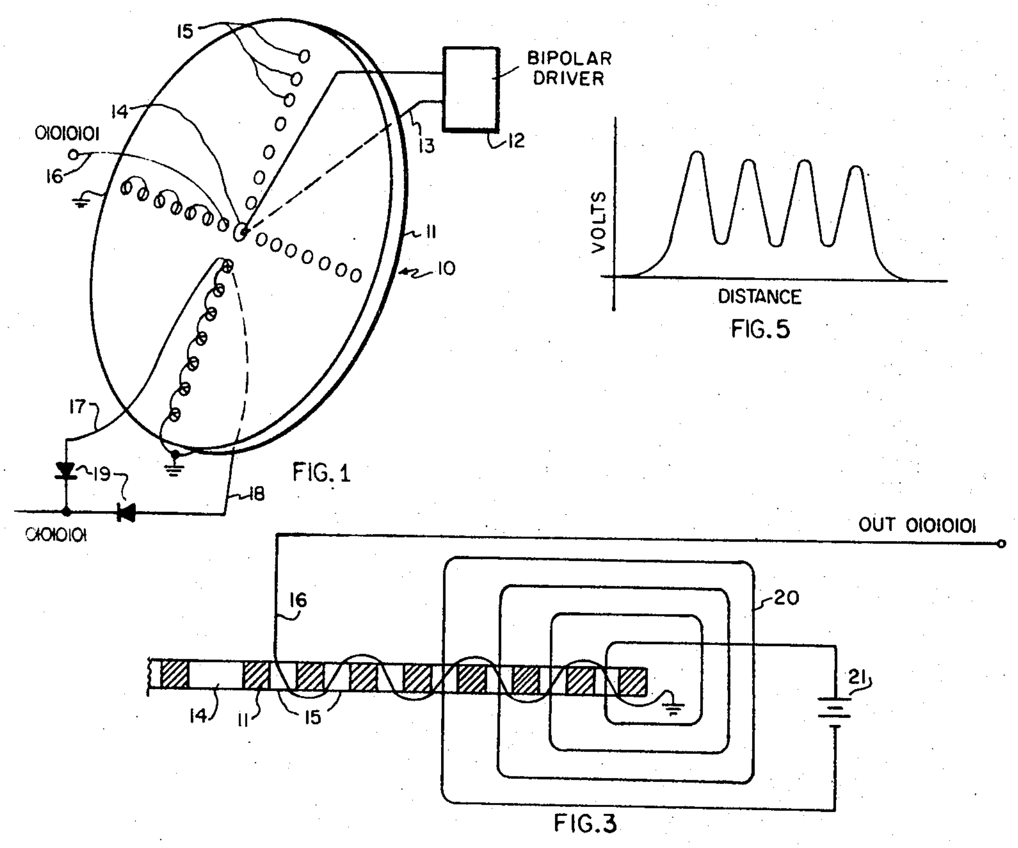
FIG. 1 is a schematic representation of a myriaperture memory device.
FIG. 3 is a schematic representation, as a partial section view, of an embodiment of the invention.
FIG. 5 is a graphical illustration of the output signal 01010101 showing improved resolving power.
Figure 2:
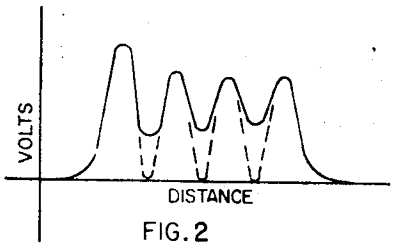
FIG. 2 is a graphical illustration of an output signal of 010101 from a myriaperture storage device showing the decrease in resolving power.

Referring to FIG. 1, a bipolar driver 12 is coupled to storage device 10 by way of winding 13 and aperture 14 of disc 11. Also shown are apertures 15 which are aligned along the radii of the disc. A winding 16 selectively threads the apertures to store a binary code, in this case 01010101, which appears as a series of output "pulses" as the disc 11 is progressively set to a first magnetic state. FIG. 2 shows these pulses with the broken line indicating a more ideal output. It can easily be seen that resolution suffers at increased distances from the central aperture. As previously stated, resolution also suffers with increased switching speeds. Also shown in FIG. 1 are windings 17 and 18 and diodes 19 which will be discussed below in connection with FIG. 4.

FIG. 3 describes an embodiment of my invention wherein a bias conductor 20 threads the apertures 15 of disc 11 in the area where resolution is degraded. A direct-current source 21 passes current through this conductor and provides local magnetic fields in the material immediately surrounding the apertures and in direction to oppose switching at the leading edges of bit locations and to aid switching at the trailing edges of bit locations, thereby producing the overall effect of reducing the switching time of each bit location and providing better definition between 1's and 0's. It should be noted that the spiral winding configuration provides linearly increasing m.m.f. toward the outermost bits and the propagating flux and the bias flux provide a flux ramp on a pedestal. In an experimental arrangement, resolution was improved from a ratio of 2:1 to a ratio of 4.3:1 using a bias current of 60 ma. and a switching speed of 2 microseconds for the worst case condition of an 8 bit word comprising alternate 1's and 0's.

Figure 4:
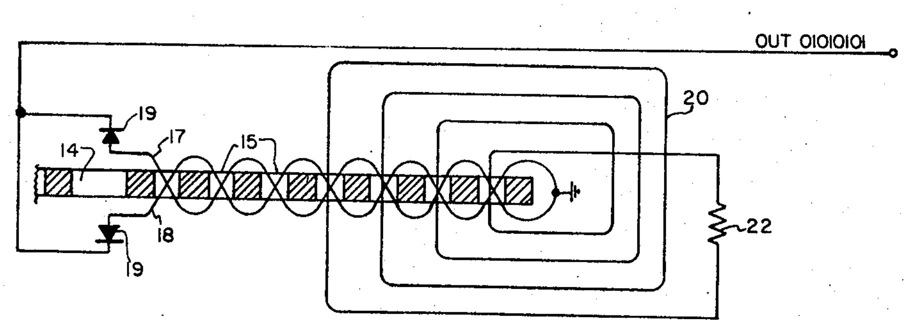
FIG. 4 is a schematic representation, as a partial section view, of another embodiment of the invention.

In the above Briley application, Ser. No. 421,749, an arrangement of mirror windings was described in order to provide useful outputs during the resetting of the disc. That arrangement is essentially shown in FIG. 1 as windings 17 and 18 and diodes 19. This same arrangement is shown in FIG. 4 which describes another embodiment of the invention for use with mirror windings. In the arrangement of FIG. 4 a resistance 22 rather than a direct-current source 21 is connected across the terminals of winding 20 since, in the mirror image case, a unidirectional bias would destroy information read during the resetting operation. In FIG. 4 the progressive flux wave which nucleates at the center of the disc provides an induced ramp m.m.f. in the winding 20 due to the series circuit of winding 20 and resistance 22. In FIG. 4 therefore, there is no unidirectional bias and both the setting and the resetting flux wave are effective to read stored data with improved resolution.

What I claim is:

1. In a magnetic storage system including a bistable magnetic element having a central aperture therein and a plurality of other apertures positioned at different radial distances from said central aperture, driver means coupled to said element and operated to provide a flux wave for reversing the magnetic state of said element progressively outward of said central aperture, and winding means selectively threading said other apertures to store data and energized by said progressive state reversals to provide said data output signals;

a series circuit including conductor means spirally threading certain ones of said other apertures and energized by said flux wave to provide a bias current therein, thereby to provide localized biasing magnetic fields in portions of said element immediately surrounding said certain other apertures for decreasing the magnetic state reversal time of areas adjacent said certain other apertures.

2. A magnetic storage system according to claim 1 in which said series circuit includes resistance means connected serially with said conductor means, whereby said bias current is allowed to flow in one direction for magnetic state reversals of a first direction and in an opposite direction for magnetic state reversals of a second direction.

3. A magnetic storage system according to claim 1 in which said series circuit includes a unidirectional bias current source connected serially with said conductor means to provide a bias current in said conductor means flowing in the same direction as the bias current provided by said flux wave.

References Cited

UNITED STATES PATENTS

| | | | |
|---|---|---|---|
| 2,944,249 | 5/1960 | Kuntzleman | 340—174 |
| 3,017,518 | 1/1962 | Hanysz | 340—174 |
| 3,108,194 | 10/1963 | Weller | 307—88 |
| 3,155,960 | 11/1964 | Bockemuehl | 340—174 |

BERNARD KONICK, *Primary Examiner.*

B. L. HALEY, *Assistant Examiner.*